(12) United States Patent
Farley et al.

(10) Patent No.: US 9,820,106 B2
(45) Date of Patent: Nov. 14, 2017

(54) MULTI-DEVICE ARCHITECTURE FOR TRACKING DEVICE ACCESS

(71) Applicant: Tile, Inc., San Mateo, CA (US)

(72) Inventors: Michael George Farley, Foster City, CA (US); Jose Pons Vega, Belmont, CA (US); Charles Y. Choi, San Francisco, CA (US); Renu Janjam, San Jose, CA (US)

(73) Assignee: Tile, Inc., San Mateo, CA (US)

( * ) Notice: Subject to any disclaimer, the term of this patent is extended or adjusted under 35 U.S.C. 154(b) by 85 days.

(21) Appl. No.: 14/882,022

(22) Filed: Oct. 13, 2015

(65) Prior Publication Data

US 2017/0105100 A1   Apr. 13, 2017

(51) Int. Cl.
*H04W 24/00* (2009.01)
*H04W 4/04* (2009.01)
*H04W 4/02* (2009.01)

(52) U.S. Cl.
CPC ............. *H04W 4/04* (2013.01); *H04W 4/021* (2013.01)

(58) Field of Classification Search
CPC ................................ H04W 4/04; H04W 4/021
USPC ............................. 455/456.1–456.3; 370/338
See application file for complete search history.

(56) References Cited

U.S. PATENT DOCUMENTS

| 2006/0258371 | A1* | 11/2006 | Krishnamurthi | ........ H04W 4/02 455/456.1 |
| 2007/0290836 | A1* | 12/2007 | Ainsworth | ............. G06Q 10/08 340/539.13 |
| 2009/0282123 | A1* | 11/2009 | Fornari | ............... H04L 12/1836 709/207 |
| 2014/0213301 | A1* | 7/2014 | Evans | ................... H04W 4/023 455/456.3 |

* cited by examiner

*Primary Examiner* — Marcos Batista
(74) *Attorney, Agent, or Firm* — Fenwick & West LLP

(57) ABSTRACT

A tracking server stores information identifying one or more community mobile devices and information identifying one or more tracking devices within a proximity of each of the one or more community mobile devices. The tracking server receives a tracking device request from a mobile device. The tracking device request includes information identifying a tracking device and configuration instructions for configuring the tracking device. The tracking server identifies a community mobile device from the one or more community mobile devices within a proximity of the tracking device. The tracking server sends the tracking device request to the identified community mobile device. The identified community mobile device is configured to forward the tracking device request to the tracking device and the tracking device is configured to re-configure the tracking device based on the configuration instructions included in the tracking device request.

21 Claims, 6 Drawing Sheets

US 9,820,106 B2

MULTI-DEVICE ARCHITECTURE FOR TRACKING DEVICE ACCESS

BACKGROUND

1. Field of the Disclosure

This disclosure relates generally to communicating with a tracking device, and more specifically, to communicating with a tracking device via a connected device.

2. Description of the Related Art

Electronic tracking devices have created numerous ways for people to track the locations of people and/or objects. For example, a user can use GPS technology to communicate with a device remotely or determine a location of the user. In another example, a user can attach a tracking device to an important object, such as keys or a wallet, and use the features of the tracking device to more quickly communicate with the object, (e.g., if it becomes lost).

However, traditional tracking devices and corresponding systems suffer from one or more disadvantages. For example, communicating with a tracking device from a far-away distance requires a considerable amount of power. Thus, battery life of a tracking device is often limited. Further, technology for long-range communication is expensive, and often requires sophisticated circuitry for operating in connection with an associated electronic device (e.g., a mobile device). Additionally, low-power options for tracking devices are limited to communicating with nearby objects that require a user associated with the tracking devices to be within a close proximity of the tracking devices, limiting the usefulness of such tracking devices.

SUMMARY

Embodiments relate to a tracking server. The tracking server stores information identifying one or more community mobile devices and information identifying one or more tracking devices within a proximity of each of the one or more community mobile devices. The tracking server receives a tracking device request from a mobile device. The tracking device request includes information identifying a tracking device and configuration instructions for configuring the tracking device. The tracking server identifies a community mobile device from the one or more community mobile devices within a proximity of the tracking device. The tracking server sends the tracking device request to the identified community mobile device. The identified community mobile device is configured to forward the tracking device request to the tracking device and the tracking device is configured to re-configure the tracking device based on the configuration instructions included in the tracking device request.

BRIEF DESCRIPTION OF THE DRAWINGS

Figure (FIG. 1 illustrates an environment for use in locating a tracking device according to principles described herein.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments described herein provide a user with the ability to locate one or more low-power tracking devices by leveraging the capabilities of a mobile device associated with a community of users (e.g., users of the same tracking device system) in a secure and privacy-focused environment.

A user can attach a tracking device to or enclose the tracking device within an object, such as a wallet, keys, a car, a bike, a pet, or any other object that the user wants to track. The user can then use a mobile device (e.g., via a software application installed on the mobile device) to communicate with the tracking device and the corresponding object. For example, the mobile device can perform a local search for a tracking device attached to a near-by object. However, in situations where the user is unable to locate the tracking device using their own mobile device (e.g., if the tracking device is beyond a distance within which the mobile device and the tracking device can communicate), the principles described herein allow the user to leverage the capabilities of another user of a tracking system (a "community user" hereinafter).

In particular, a tracking system (also referred to herein as a "cloud server" or simply "server") can associate a tracking device to one or more community mobile devices (other devices of other users associated with the tracking system) within a threshold proximity of the tracking device. If the user's tracking device is out of range of the user's mobile device, the user can send a tracking device request to the tracking system, which is in communication with one or more mobile devices associated with the community of users in communication with the system. The tracking system identifies a community mobile device within a threshold proximity to the tracking device and sends the tracking device request to the community mobile device which in turn sends the tracking device request to the tracking device. The tracking system sends the tracking device request received by the user to the tracking device via the community mobile device, thereby enabling the user to communicate with the tracking device.

Environment Overview

Figure 1:
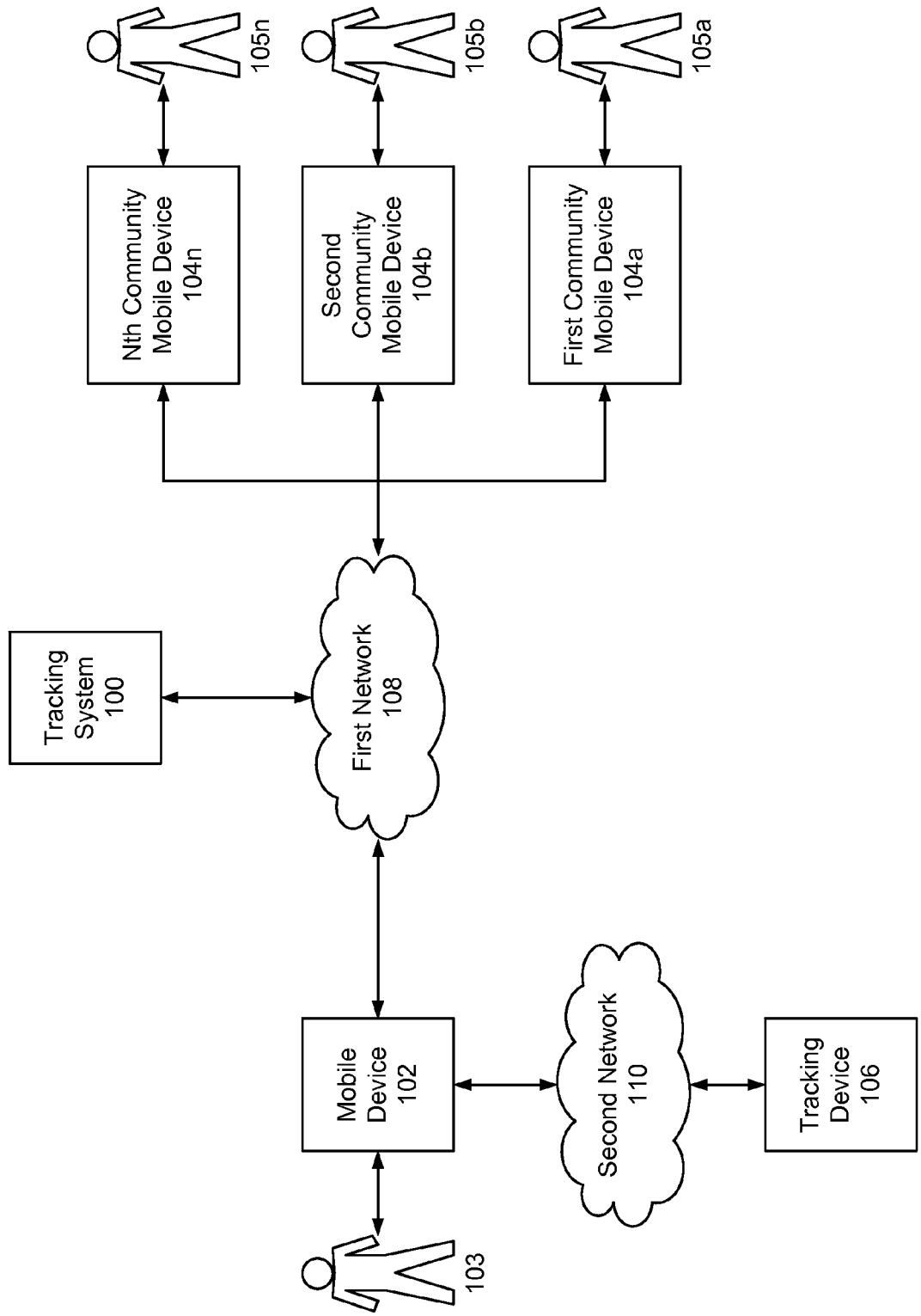

FIG. 1 illustrates an environment for use in locating a tracking device 106. FIG. 1 illustrates a tracking system 100 communicatively coupled to a mobile device 102 associated with a user 103 and a plurality of community mobile devices 104a through 104n (collectively referred to herein as "community mobile devices 104") associated with a plurality of users 105a through 105n of the tracking system 100 (collectively referred to herein as "community users 105"). As will be explained in more detail below, the tracking system 100 allows the user 103 to communicate with the tracking device 106 associated with the user 103. In some embodiments, the tracking system 100 leverages the capabilities of the community mobile devices 104 to send a tracking device request to the tracking device 106 if the tracking device 106 is not within a threshold proximity of the mobile device 102. In some configurations, the user 103 can own and register multiple tracking devices 106. Although FIG. 1 illustrates a particular arrangement of the tracking system 100, the mobile device 102, the community mobile devices 104, and the tracking device 106, various additional arrangements are possible.

In some configurations, the user 103 can be part of the community of users 105. Further, one or more users of the community of users 105 can own and register one or more tracking devices 106. Thus, any one of the users within the community of users 105 can communicate with the tracking system 100 and leverage the capabilities of the other community of users 105 in addition to the user 103 to communicate with a tracking device 106.

The tracking system 100, the mobile device 102 and the community mobile devices 104 communicate via a first network 108. The tracking system 100, the mobile device 102 and the community mobile devices 104 can communicate using any communication platforms and technologies suitable for transporting data and/or communication signals, including known communication technologies, devices, media, and protocols supportive of remote data communications. The first network 108 can include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, the mobile device 102, and the community mobile devices 104.

The mobile device 102 and the community of mobile devices 104 can communicate with a tracking device 106 via a second network 110. The second network 110 can be a similar or different type of network as the first network 108. In some embodiments, the second network 110 includes a wireless network with a limited communication range, such as a Bluetooth or Bluetooth Low Energy (BLE) wireless network. In some configurations, the second network 110 is a point-to-point network including the tracking device 106 and one or more mobile devices (e.g., the mobile device 102 and the community of mobile devices 104) within a threshold proximity of the tracking device 106. Accordingly, any given mobile device (such as the mobile device 102 and the community mobile devices 104) is only able to communicate with the tracking device 106 if it is within a threshold proximity to the tracking device 106. In some configurations, the mobile device 102 and one or more of the community mobile devices 104 can each be associated with multiple tracking devices 106 associated with various users (e.g., the user 103 and the community of users 105).

As noted above, FIG. 1 illustrates the mobile device 102 associated with the user 103. The mobile device 102 can be configured to perform one or more functions described herein with respect to communicating with tracking devices (e.g., tracking device 106). For example, the mobile device 102 receives input from the user 103 representative of information about the user 103, information about a tracking device 106, and a tracking device request (described below) to be sent to the tracking device 106. The mobile device 102 sends the tracking device request to the tracking device 106 via the first network 108 or the second network 110. In some configurations, the mobile device 102 cannot send the tracking device request to the tracking device 106 via the second network, for example, due to hardware limitations of the mobile device 102 (such as the tracking device 106 being located more than a threshold distance away from the mobile device 102). In such configurations, the mobile device 102 sends the tracking device request to the tracking device 106 via the first network 108.

In some embodiments, the mobile device 102 determines that the tracking device 106 is within a threshold proximity of the mobile device 102 via the second network 110. The mobile device 102 enables the user 103 to communicate with the detected tracking device 106. For example, the mobile device 102 receives user input from the user 103 (e.g., via an application executing on the mobile device 102 and/or an interactive graphical user interface displayed by the mobile device 102 to the user 103), requesting the mobile device 102 send a tracking device request to the tracking device 106. In response, the mobile device 102 sends the tracking device request to the tracking device 106. The mobile device 102 can notify the user that the tracking device request was successfully received by the tracking device 106, for instance in response to a confirmation signal received from the tracking device 106.

In other embodiments, the mobile device 102 determines that the tracking device 106 is located outside a threshold proximity of the mobile device 102. That is, the mobile device 102 is located beyond the immediate range of communication with the tracking device 106 (e.g., beyond the communicative distance capabilities of the second network 110). In such embodiments, the mobile device 102 enables the user 103 to communicate with the tracking device 106 via the first network 110. For example, the mobile device 102 sends the received tracking device request to the tracking system 100 via the first network 108, which in turn routes the request to one or more community mobile devices 104 for forwarding to the tracking device 106 (if the one or more community mobile devices 104 are within a threshold proximity to the tracking device 106). The mobile device 102 can receive a confirmation signal from the tracking system 100 indicating the tracking device request was successfully received by the tracking device 106 via a community device 104. The mobile device 102 can notify the user the tracking device request was successfully received by the tracking device 106.

As used herein, a "tracking device request" refers to any communication sent to the tracking device 106. In some embodiments, tracking device requests can include requests for the performance of a function by a tracking device. In some configurations, the tracking device request includes instructions for the tracking device 106 to emit a sound or song from a speaker of the tracking device 106. The tracking device request can additionally include instructions for the tracking device 106 to emit light from a light emitting diode (LED), to display an indication on a tracking device display, or to display or emit any other type of notification (such as vibrations).

In addition, the tracking device request can include configuration information for the tracking device 106. The configuration information can include a list of users and/or mobile devices to add to a list of verified users/devices stored by the tracking device. In such embodiments, users and/or mobile devices on the verified list stored by the tracking device 106 can communicate with the tracking device 106, can send tracking device requests to the tracking device 106, and can otherwise interact with or configure the tracking device 106. The configuration information can further include a list of users and/or mobile devices to remove from a list of verified users/devices stored on the tracking device. Other configuration information includes beacon signal frequency, power settings, and enabling/disabling different sensors.

The tracking system 100 can be configured to provide a number of features and services associated with communication between one or more tracking devices 106, and/or one or more associated users 103, 105. For example, the tracking system 100 can manage information and/or user profiles associated with the user 103, the community users 105, and the tracking devices 106. In particular, the tracking system 100 can manage information associated with the tracking device 106 and/or other tracking devices associated with or within a threshold proximity of the user 103 and the community users 105, and the mobile device 102 and community mobile devices 104, respectively. The tracking system 100 is configured to receive, store, and transmit user information, tracking device information, tracking device requests, and/or information about the mobile device 102 and the community of mobile devices 104. The tracking system 100 additionally receives tracking device information associated with the tracking device 106 from any community mobile devices 104 within a threshold proximity of the tracking device 106. The tracking system 100 is able to associate the mobile device 102, the user 103, and/or the tracking device 106, and to transmit the tracking device request from the mobile device 102 to the tracking device 106 via the first network 108 and any community mobile devices 104 within a threshold proximity of the tracking device 106. That is, the tracking system 100 leverages the capabilities of the community mobile devices 104 near the tracking device 106 to send the tracking device request to the tracking device 106.

As shown in FIG. 1 and as noted above, the tracking system 100 communicates with a plurality of community mobile devices 104 associated with corresponding community users 105. For example, an implementation can include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 can also include functionality that enables each community mobile device 104 to identify a tracking device 106 within a threshold proximity of the community mobile device 104. In one example, a first community mobile device 104a within a threshold proximity of a tracking device 106 can identify the tracking device 106 (e.g., using a unique identifier associated with and transmitted by the tracking device 106) and can communicate the identification of the tracking device 106 to the tracking system 100, which in turn can store the association between the community mobile device 104a and the tracking device 106, along with (for example) a timestamp indicating the time that the community mobile device 104a detected the tracking device 106, a distance from the community mobile device 104a to the tracking device 106, and the like. This information can be used by the tracking system 100 to identify a community mobile device 104 located within a threshold proximity to the tracking device 106. In some embodiments, the tracking system 100 can identify a plurality of community mobile devices 104 located within a threshold proximity to the tracking device 106, and can select the community mobile device 104 associated with the most recent time of detecting the tracking device 106, the closest distance to the tracking device 106, or any suitable factor. In some embodiments, the steps performed by the first community mobile device 104a (for instance, the detection of the tracking device 106) can be hidden from the first community user 105a. Accordingly, the first community mobile device 104a can detect and can transmit a tracking device request to the tracking device 106 without bothering and without the knowledge of the first community user 105a, thereby ensuring the privacy of the owner of the tracking device 106 and improving the experience of the user 105a.

As noted above, the tracking system 100 can assist the user 103 in transmitting a tracking device request to the tracking device 106 outside of the range of the mobile device 102. The tracking device 106 can be a chip, tile, tag, or other device for housing circuitry and that can be attached to or enclosed within an object such as a wallet, keys, purse, car, pet, or other object that the user 103 may track. Additionally, the tracking device 106 can include a transmitter for broadcasting signals (such as beacon signals), and a receiver for receiving communications (such as tracking device requests). In one configuration, the tracking device 106 can periodically or in response to an event (such as a detected motion of the tracking device 106) transmit a beacon signal that can be detected using a nearby mobile device 102 and/or community mobile device 104. The strength of the signal emitted from the tracking device 106 can be used to determine a distance between the tracking device 106 and the mobile device 102 or community mobile devices 104 that detects the signal. In some cases, the strength of signal or absence of a signal may be used to indicate that the tracking device 106 is not within a threshold proximity of a mobile device (e.g., mobile device 102 and community mobile device 104).

In some configurations, the environment illustrated in FIG. 1 does not include the tracking system 100. In such configurations, the mobile device 102 sends a tracking device request to one or more community mobile devices 104 connected via the first network 108 and/or the second network 100. The tracking device request includes a tracking device ID identifying a tracking device 106. The one or more community mobile devices 104 within a threshold proximity of the tracking device 106 send the tracking device request to the tracking device 106. The one or more community mobile devices 104 receive a confirmation signal from the tracking device 106 indicating successful receipt of the tracking device request, and forward the confirmation to the mobile device 102.

System Overview

Figure 2:
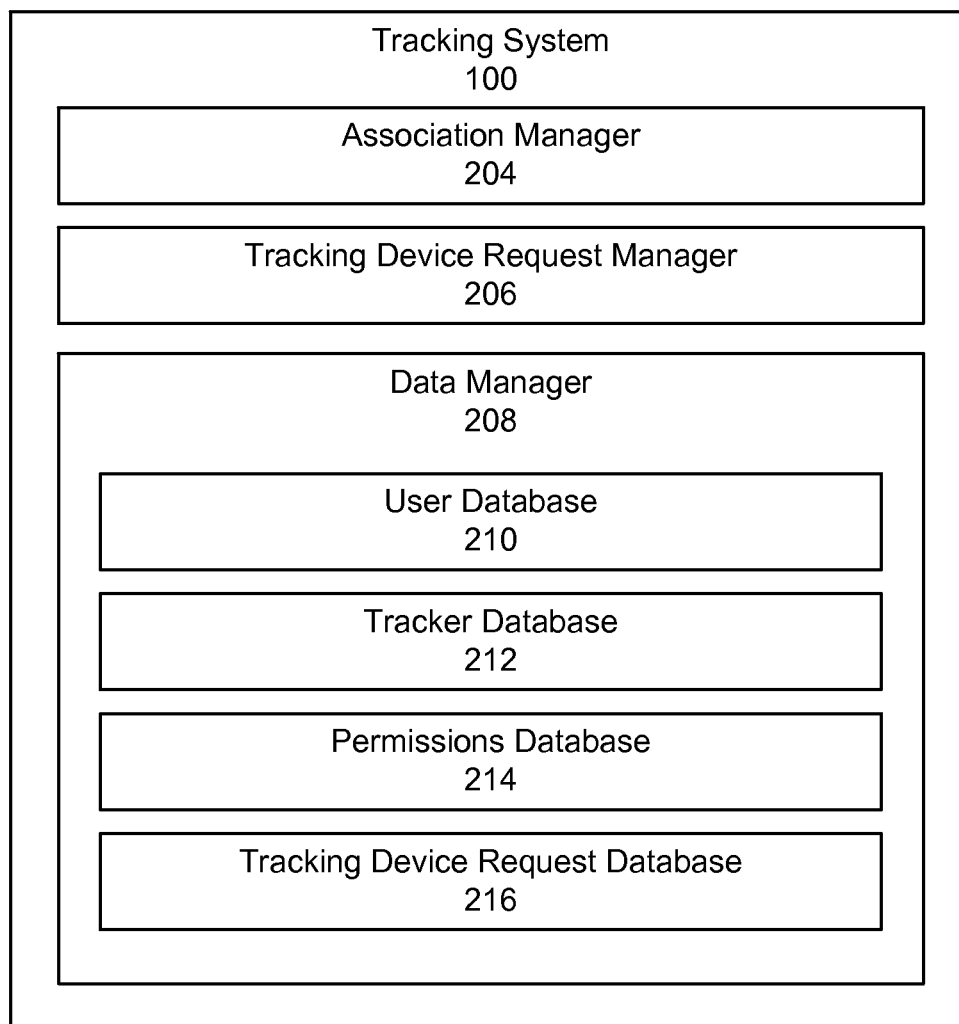
FIG. 2 illustrates a tracking system of the environment of FIG. 1, according to one embodiment.

FIG. 2 illustrates a diagram showing example components of the tracking system 100. As shown, the tracking system 100 includes, but is not limited to, an association manager 204, a tracking device request manager 206, and a data manager 208 (herein collectively referred to as "managers 204-208"), each of which can communicate using any suitable communication technologies. It will be recognized that although managers 204-208 are shown to be separate in FIG. 2, any of the managers 204-208 can be combined into fewer managers, such as into a single manager, or divided into more managers as can serve a particular embodiment. The tracking system 100 can be a server, such as a cloud server, a data center, a computer specially configured to perform the functionalities described herein, or any other suitable system.

The association manager 204 receives and processes information about one or more specific tracking devices 106 within a threshold proximity of one or more community mobile devices 104 configured to scan for nearby tracking devices 106. The association manager 204 stores the received information in a database (e.g., tracker database 212). In some configurations, the association manager 204 associates the tracking devices 106 with the one or more community mobile devices 104. For example, the association manager 204 can store information about the tracking device 106, such as a tracking device identifier (ID) in association with an identifier for each of one or more community mobile devices 104 within a threshold proximity of the tracking device 106.

In some configurations, the association manager 204 receives information about the tracking device 106 within a threshold proximity of the one or more community mobile devices 104 and determines the tracking device 106 has a pending tracking device request from the mobile device 102 when updating the database (e.g., tracker database 212). The association manager 204 identifies the one or more community mobile devices 104 within a threshold proximity of the tracking device 106 and provides the information about the association (such as a tracking device ID, an ID for each of the identified community mobile devices 104, etc.) to the tracking device request manager 206.

The tracking device request manager 206 (hereinafter referred to as "request manager 206") receives, processes, and transmits tracking device requests from the mobile device 102 to the tracking device 106 via the community mobile devices 104 within a threshold proximity of the tracking device 106.

In one example, the request manager 206 receives the tracking device requests from the mobile device 102. In response, the request manager 206 queries a database (e.g., tracker database 212) and identifies one or more community mobile devices 104 within a threshold proximity of the tracking device 106. In some configurations, the request manager 206 queries the database using a tracking device ID associated with the tracking device request to identify the community mobile devices 104 within a threshold proximity of the tracking device 106. The request manager 206 sends the received tracking device request to the one or more identified community mobile devices 104 within a threshold proximity of the tracking device 106. The request manager 206 can receive a confirmation from the one or more community mobile devices 104 indicating the tracking device 106 successfully received the tracking device request, and can forward the confirmation to the mobile device 103.

In another example, the request manager 206 stores the tracking device request. The request manager 206 can set a flag in a database (e.g., tracker database 212) indicating that the tracking device 106 has a pending tracking device request. Setting a flag for a tracking device 106 can include storing and/or associating a value associated with the tracking device 106 that indicates that the tracking device 106 has a pending tracking device request. This can include setting a flag, marker, digital value, or other indication that the tracking device 106 has a pending tracking device request and maintaining or storing the indication of the associated tracking device 106 on the tracking system 100 (e.g., on a database). In response to the receipt by the association manager 204 of a signal from a community mobile device 104 indicating that the community mobile device 104 is within a threshold proximity of the tracking device 106, the association manager 204 can query the request manager 206 to determine if a flag indicating a pending tracking device request is set for the tracking device 106. In response to such a determination, the tracking device request manager 206 can forward the tracking device request to the community mobile device 104 as noted above. Upon receiving a confirmation signal indicating that the tracking device 106 has received the tracking device request (or in response to forwarding the tracking device request to the community mobile device 104), the request manager 206 can remove the flag in the database indicating the tracking device 106 has a pending tracking device request.

The data manager 208 stores and manages information associated with users, mobile devices, tracking devices, tracking device requests and other data that can be stored and/or maintained in a database related to tracking device requests. As shown, the data manager 208 may include, but is not limited to, a user database 210, a tracker database 212, permissions database 214, and communication request database 216. It will be recognized that although databases and data within the data manager 208 are shown to be separate in FIG. 2, any of the user database 210, the tracker database 212, the permissions database 214, and the tracking device request database 216 may be combined in a single database or manager, or divided into more databases or managers as may serve a particular embodiment.

The user database 210 stores data related to various users. For example, the user database 210 can include data about the user 103 as well as data about each user 105 in a community of users 105. The community of users 105 can include any user that has provided user information to the tracking system 100 via a mobile device 102, 104 or other electronic device. The user information can be associated with one or more respective tracking devices 106, or can be stored without an association to a particular tracking device 106. For example, a community user 105 can provide user information and permit performance of tracking functions on the community mobile device 104 without owning or being associated with a tracking device 106. The user database 210 can also include information about one or more mobile devices 102, 104 or other electronic devices associated with a particular user 103, 105.

The tracker database 212 can be used to store data related to tracking devices 106 and community mobile devices 104. For example, the tracker database 212 can include tracking data for any tracking device 106 that has been registered with the tracking system 100. Tracking data can include unique tracking device IDs associated with individual tracking devices 106. The tracking device IDs can be associated with one or more community mobile devices 104 within a threshold proximity of the tracking device 106. Additionally, the tracker database 212 can include any flags or other indications that the tracking device 106 has a pending tracking device request.

The permissions database 214 can include information describing permissions and permission levels associated with a particular user 103 and/or tracking device 106. For example, the permissions database 214 can identify additional users 105 with shared permissions (such as access permissions, communication permissions, and the like) for a tracking device 106. The tracking device request database 216 can include information related to the tracking device request received from the user 103 via a mobile device 102, such as pending tracking device request flags, times of receipt of the tracking device requests, identities of the user and/or mobile device associated with the tracking device request, and the like.

Figure 3:
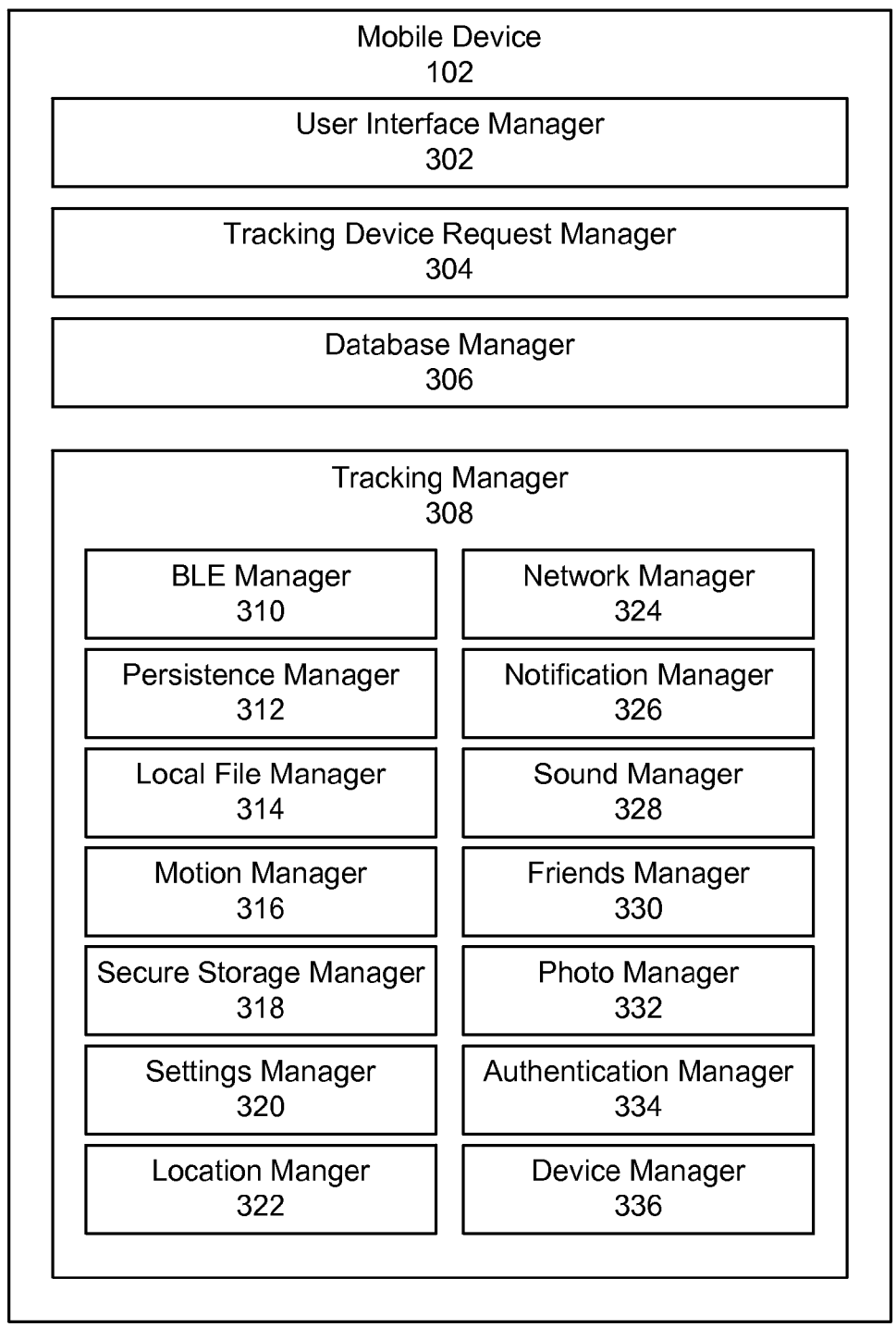
FIG. 3 illustrates a mobile device of the environment of FIG. 1, according to one embodiment.

FIG. 3 illustrates a diagram showing example components of the mobile device 102. As shown, the mobile device 102 may include, but is not limited to, a user interface manager 302, a tracking device request manager 304, a database manager 306, and a tracking manager 308, each of which may be in communication using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 facilitates the user 103 in providing data to and access to data on the tracking system 100 and/or tracking device 106. Further, the user interface manager 302 provides a user interface by which the user 103 can communicate with tracking system 100 and/or tracking device 106 via mobile device 102.

The request manager 304 receives and processes a tracking device request input to the mobile device 102 from the user 103 to send to a tracking device 106. In one configuration, the user 103 can provide a tracking device request for a tracking device 106 via the user interface manager 302, and the request manager 304 can process and transmit the tracking device request to the tracking device 106 over a second network 110. In another embodiment, the request manager 304 can process and provide any necessary data to the tracking system 100 for processing and transmitting the tracking device request to other users 105 over a first network 108. In some configurations, the tracking device request is provided via user input. Alternatively, the tracking device request is transmitted automatically in response to the mobile device 102 determining that a tracking device 106 is out of range (not within a threshold proximity) of the mobile device 102.

The database manager 306 maintains data related to the user 103, the tracking device 106, the tracking device request, or other data that can be used for communicating with a tracking device 106 and/or providing the tracking device request to the tracking system 100 for transmitting to one or more tracking devices 106 associated with the user 103. Further, the database manager 306 maintains any information that can be accessed using any other manager on the mobile device 102.

The tracking manager 308 includes a tracking application (e.g., a software application) for communicating with a tracking device 106 associated with the user 103. For example, the tracking manager 308 can be one configuration of a tracking application installed on the mobile device 102 that provides the functionality for communicating with a tracking device 106 using community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 can be used to manage communication with one or more tracking devices 106. The persistence manager 312 can be used to store logical schema information that is relevant to the tracking manager 308. The local files manager 314 can be responsible for managing all files that are input or output from the mobile device 102. The motion manager 316 can be responsible for all motion management required by the tracking manager 308. The secure storage manager 318 can be responsible for storage of secure data, including information such as passwords and private data that would be accessed through this sub-system. The settings manager 320 can be responsible for managing settings used by the tracking manager 308. Such settings can be user controlled (e.g., user settings) or defined by the tracking manager 308 for internal use (e.g., application settings) by a mobile device 102 and/or the tracking system 100. The location manager 322 can be responsible for all location tracking done by the tracking manager 308. For example, the location manager 322 can manage access to the location services of the mobile device 102 and works in conjunction with other managers to persist data.

The network manager 324 may be responsible for all Internet communications from the tracking manager 308. For example, the network manager 324 can mediate all Internet API calls for the tracking manager 308. The notification manager 326 can be responsible for managing local and push notifications required by the tracking manager 308. The sound manager 328 can be responsible for playback of audio cues by the tracking manager 308. The friends manager 330 can be responsible for managing access to contacts and the user's social graph. The photo manager 332 can be responsible for capturing and managing photos used by the tracking manager 308. The authentication manager 334 can be responsible for handling the authentication (e.g., sign in or login) of users. The authentication manager 334 can also include registration (e.g., sign up) functionality. The authentication manager 334 can further coordinate with other managers to achieve registration functionality. The device manager 336 can be responsible for managing the devices discovered by the tracking manager 308. The device manager 336 can further store and/or maintain the logic for algorithms related to device discovery and update.

Figure 4:
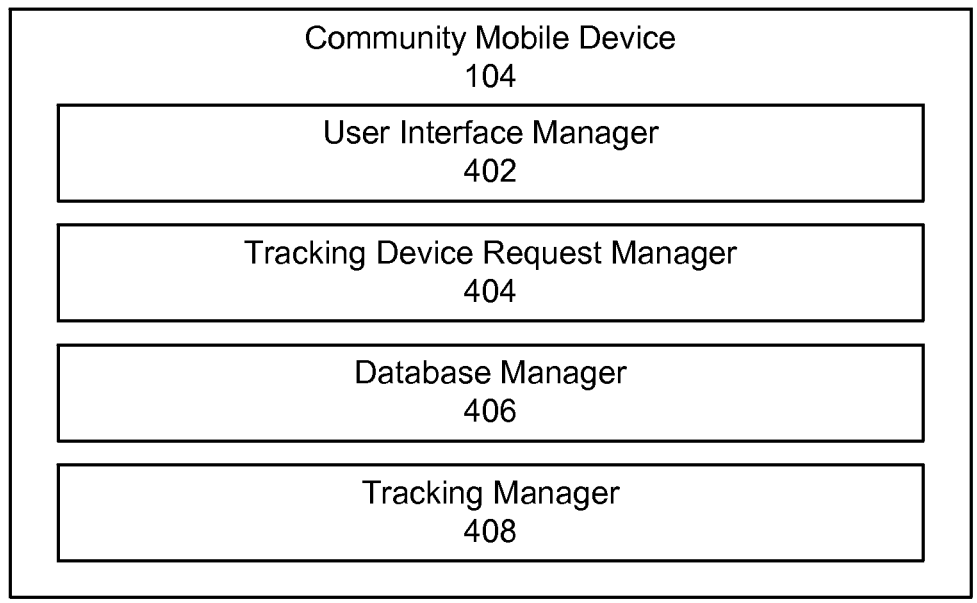
FIG. 4 illustrates a community mobile device of the environment of FIG. 1, according to one embodiment.

FIG. 4 illustrates a diagram showing example components of a community mobile device 104. As shown, the community mobile device 104 may include, but is not limited to, a user interface manager 402, a tracking device request manager 404, a database manager 406, and a tracking manager 408, each of which may be in communication using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The user interface manager 402 facilitates the community user 105 of the community mobile device 104 in providing data to and access to data on the tracking system 100 and/or tracking device 106. Further, the user interface manager 402 provides a user interface by which the community user 105 can communicate with tracking system 100 and/or tracking device 106 via mobile device 102.

The request manager 404 transmits a tracking device request to one or more nearby tracking devices 106. In some configurations, the request manager 404 is configured to continuously or periodically scan (e.g., once per second) nearby areas to determine if there is a tracking device 106 within a threshold proximity of the community mobile device 104. The request manager 404 can identify the tracking device 106 (e.g., using a unique identifier associated with and transmitted by the tracking device 106) and can communicate the identification of the tracking device 106 and an associated timestamp to the tracking system 100.

The request manager 404 receives and processes a tracking device request transmitted to the community mobile device 104 by the tracking system 100. If the tracking device 106 is still within a threshold proximity of the community mobile device 104, the request manager 404 transmits the tracking device request to the tracking device 106.

The request manager 404 receives a confirmation signal from the tracking device 106 indicating the tracking device 106 has received the tracking device request. In response, the request manager 404 transmits the confirmation signal to the tracking system 100.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a threshold proximity of the tracking device 106.

Interaction

Figure 5A:
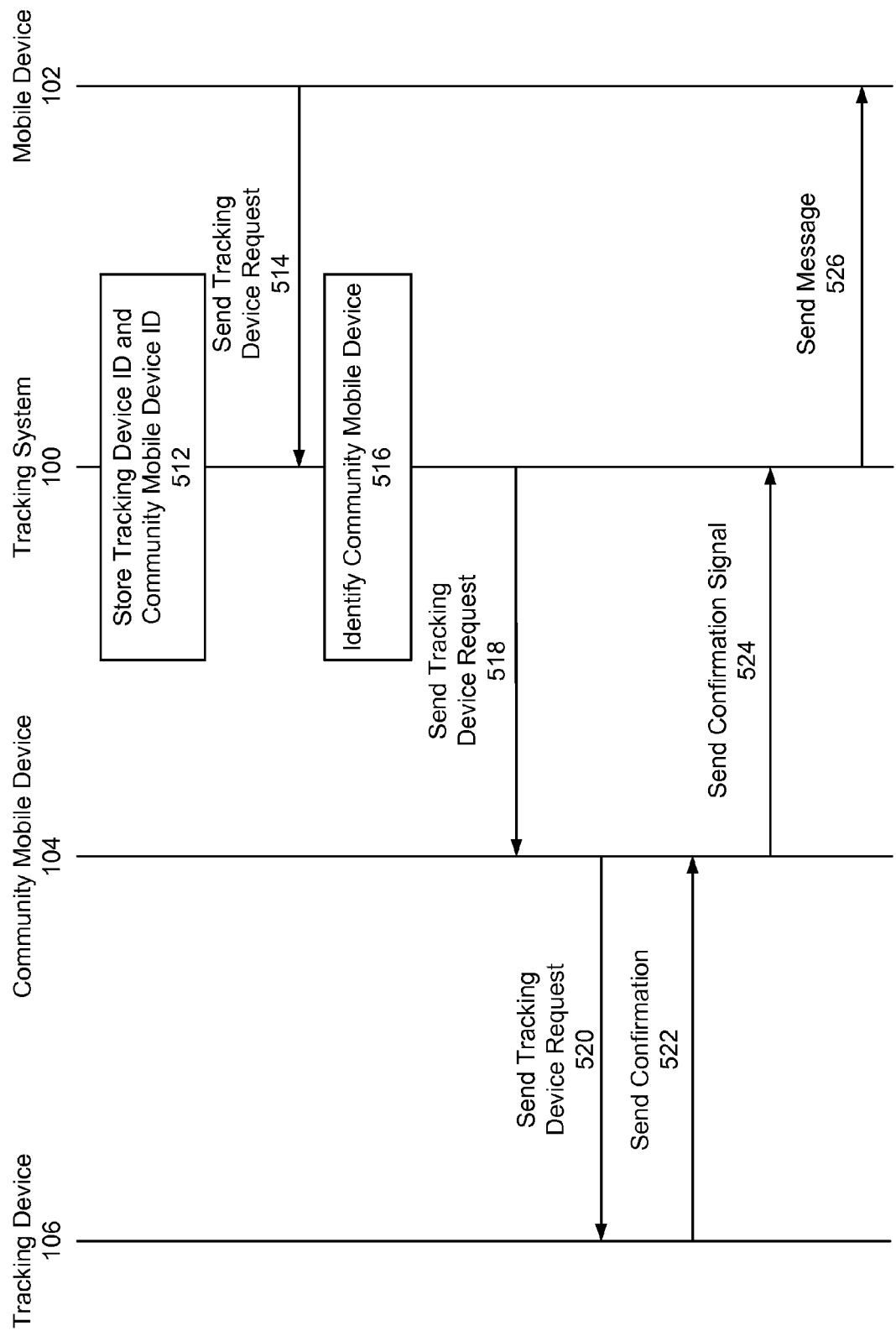
FIG. 5A illustrates a process of communicating with a tracking device, according to one embodiment.

FIG. 5A illustrates an interaction diagram for sending a tracking device request from a mobile device 102 to a tracking device 106 leveraging the capabilities of a community mobile device 104 and a tracking system 100, according to one embodiment.

The tracking system 100 receives or otherwise obtains information from a community mobile device 104 of one or more tracking devices 106 within a threshold proximity of the community mobile device 104. The information received from the community mobile device 104 can include a unique tracking device ID identifying the tracking device 106 and an ID identifying the community mobile device. The tracking system 100 stores 512 the tracking device ID associated with the tracking device 106 in association with a community mobile device ID for the community mobile device 104 within a threshold proximity of the tracking device 106. The tracking system 100 can further store additional information associated with the community mobile device 104 (e.g., a mobile phone number).

The mobile device 102 sends 514 a tracking device request to the tracking system 100. The tracking device request includes a unique tracking device ID identifying the tracking device 106 associated with the tracking device request and identifying one or more actions or functions to be implemented by the tracking device 106. In some examples, the tracking device request can include additional information associated with the tracking device 106 (e.g., permissions), information identifying the user 103 of the mobile device 102 (e.g., name, username, authentication information), and information associated with the mobile device 102 (e.g., a mobile phone number).

The tracking system 100 identifies 516 the community mobile device 104 within a threshold proximity of the tracking device 106. The tracking system 100 sends 518 the tracking device request to the identified community mobile device 104. The tracking device request includes any instructions and/or information necessary for the community mobile devices 104 to send the tracking device request to the tracking device 106. If the community mobile devices 104 is still within a threshold proximity of the tracking device 106 (e.g., if the community mobile device 104 is within range of the communication capabilities of the tracking device 106), the community mobile device 104 sends 520 the tracking device request to the tracking device 106. In an embodiment where the community mobile device 104 is no longer within a threshold proximity of the tracking device 106, the community mobile device 104 can send an indication to this effect to the tracking system 100, which in response can identify a second community mobile device 104 previously determined to be within a threshold proximity to the tracking device 106 (for instance, a community mobile device 104 determined to be in proximity to the tracking device 106 at an earlier time, from a further distance, and the like), and can forward the tracking device request to the second community mobile device 104.

The tracking device 106 sends 522 a confirmation signal to the community mobile device 104 indicating the tracking device request was successfully received. In some embodiments, the confirmation signal is only sent after or in response to the implementation of the action or function specified by the tracking device request. The community mobile device 104 sends 524 the confirmation signal to the tracking system 100. The community mobile device 104 can send additional information to the tracking system 100 in the confirmation. For example, the community mobile device 104 can send a location of the community mobile device 104 and a signal strength associated with the tracking device 106 to indicate a level of proximity of the tracking device 106 to the location of the community mobile device 104. For example, if a signal strength is high, the location provided to the tracking system 100 is likely to be more accurate than a location accompanied by a low signal strength. This may provide additional information that the user 103 may find useful in determining, for example, a precise location of tracking device 106.

The tracking system 100 sends a message to the mobile device 102 indicating the tracking device request was successfully received by the tracking device 106 via a community mobile device 104. In addition to the confirmation indicating the tracking device 106 successfully received the tracking device request, the message can include information associated with the identified community mobile devices 104 (e.g., location of the one or more identified community mobile devices 104). The message can be a text message, push notification, ring tone, automated voice message, or other response. The message can be displayed to the user 103 via a graphical user interface.

Figure 5B:
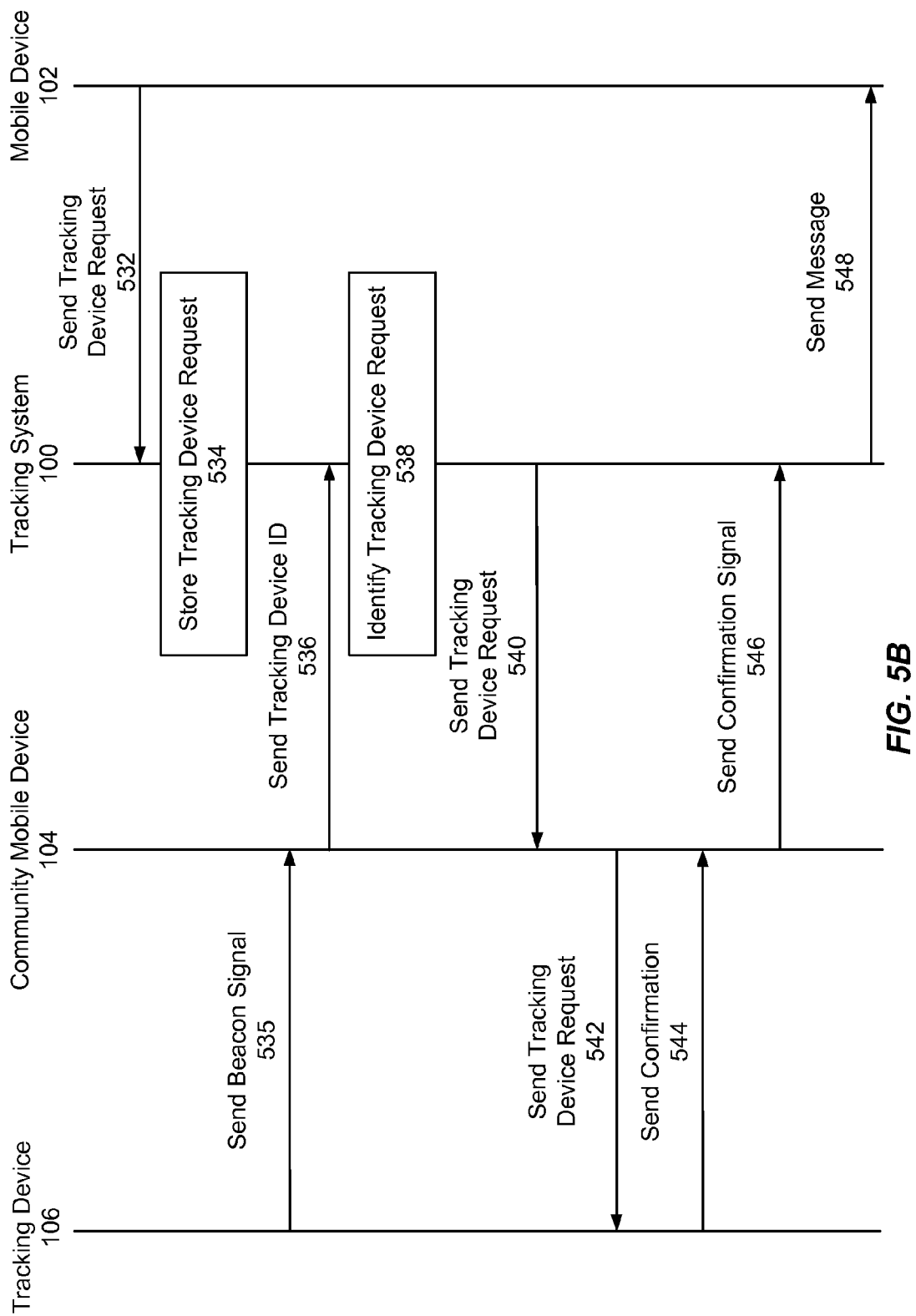
FIG. 5B illustrates a process of communicating with a tracking device, according to another embodiment.

FIG. 5B illustrates an interaction diagram for sending a tracking device request from a mobile device 102 to a tracking device 106 leveraging the capabilities of a community mobile device 104 and a tracking system 100, according to another embodiment.

The mobile device sends 532 a tracking device request to the tracking system 100. The tracking system 100 stores the received tracking device request. The community mobile device 104 sends 536 a tracking device ID of a tracking device determined to be within a threshold proximity to the community mobile device 104 (for instance, in response to a beacon signal received 535 from the tracking device 106), along with an indication that the tracking device 106 is within a threshold proximity of the community mobile device 104 (for instance, by including a location of the community mobile device 104). The tracking system 100 identifies 538 the stored tracking device request for the tracking device 106 based on the tracking device ID. The tracking system 100 sends 540 the pending tracking device request to the identified community mobile device 104. If the community mobile device 104 is still within a threshold proximity of the tracking device 106, the community mobile device 104 sends 542 the tracking device request to the tracking device 106.

The tracking device 106 sends 544 a confirmation to the community mobile device 104 indicating the tracking device request was successfully received. The community mobile device 104 sends 546 the confirmation to the tracking system 100. The tracking system 100 sends 548 a message to the mobile device 102 indicating the tracking device request was successfully received by the tracking device 106 via a community mobile device 104.

It should be noted that in some embodiments, the tracking device 106 of FIG. 1 is a mobile device configured to act as a tracking device, for instance after the passage of a threshold amount of time without receiving an input from a user, without receiving a communication from the tracking system, without detecting movement, or the like. In such embodiments, the mobile device 102 is any connected device (e.g., personal computer, laptop, tablet, etc.) capable of communicating with the tracking system 100 via the first network 108. In such embodiments, the tracking device instructions can be sent to the mobile device acting as a tracking device, enabling the mobile device to be "rung" or to otherwise play or display a notification from another mobile device or another tracking device, beneficially enabling an owner of the mobile device to locate the mobile device. In some embodiments, the mobile device can be marked as lost, for instance in response to a designation of the mobile device as lost by the owner of the mobile device, in response the passage of a threshold amount of time without a communication between the tracking system and the mobile device, in response to the passage of a threshold amount of time without a detected movement of the mobile device, or based on any other suitable factors. In some embodiments, a mobile device configured to act as a tracking device can emit period Bluetooth beacon signals. In such embodiments, when a second user with a community mobile device comes within a threshold proximity of the mobile device configured as a tracking device, the community mobile device of the second user can receive the Bluetooth beacon signal, and can report the location of the mobile device to the tracking system. In turn, the tracking system can provide a notification to the user that the mobile device configured to act as a tracking device has been found, the location of the mobile device configured to act as a tracking device, and the like.

In some embodiments, a mobile device configured to act as a tracking device can emit a notification in response to an input by a user at the tracking device. For instance, a user can interact with a button, switch, dial, displayed interface, or other interface at the tracking device, which can provide configuration instructions to the mobile device to ring. Such embodiments, beneficially allow a user to locate a mobile device from a tracking device. In some embodiments, the tracking device can, in response to a communication received from the mobile device or a lack thereof, emit one of a plurality of notifications. For example, a tracking device can emit a first ringtone in response to failing to receive, from the mobile device, a response to configuration instructions sent by the tracking device. Continuing with this example, the tracking device can emit a second ringtone if the tracking device is communicatively coupled with the mobile device, can emit a third ringtone in response to detecting the mobile device but being unable to communicatively couple to the mobile device, and emit a fourth ringtone in response to detecting the mobile device but before attempting to communicatively couple to the mobile device, can emit a fifth ringtone in response to actively attempting to communicatively couple to the mobile device, or any combination or sub-combination thereof.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled via communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
storing, at a tracking server, information identifying one or more community mobile devices and information identifying one or more tracking devices within a proximity of each of the one or more community mobile devices;
receiving, at the tracking server, a tracking device request from a mobile device, the tracking device request including information identifying a tracking device and including configuration instructions for configuring the tracking device, the configuration instructions identifying a tracking device beacon frequency;
identifying, by the tracking server, a community mobile device from the one or more community mobile devices within a proximity of the tracking device; and
sending, by the tracking server, the tracking device request to the identified community mobile device, the identified community mobile device configured to forward the configuration instructions identifying the tracking device beacon frequency to the tracking device, the tracking device configured to change a frequency of beacon signal transmission by the tracking device to the tracking device beacon frequency identified by the configuration instructions.

2. The method of claim 1, further comprising
receiving, by the tracking server, a confirmation signal from the identified community mobile device, the confirmation signal indicating the configuration instructions were received by the tracking device; and
sending, by the tracking server, a message to the mobile device, the message including the confirmation signal.

3. The method of claim 2, wherein the message further comprises information associated with the identified community mobile device.

4. The method of claim 1, wherein the configuration instructions further comprise notification instructions configured to cause the tracking device to perform functions comprising one or more of: emitting sound, playing a song, emitting light, or vibrating.

5. The method of claim 1, wherein the configuration instructions further comprise a list of mobile devices to add to a list of verified mobile devices stored by the tracking device.

6. The method of claim 1, wherein identifying the community mobile device from the one or more community mobile devices comprises identifying the community mobile device closest to the tracking device.

7. The method of claim 1, wherein identifying the community mobile device from the one or more community mobile devices comprises identifying a trusted community mobile device of the one or more community mobile devices.

8. A tracking server comprising:
a non-transitory computer-readable storage medium storing executable computer instructions that, when executed, cause the tracking server to perform steps comprising:
storing information identifying one or more community mobile devices and information identifying one or more tracking devices within a proximity of each of the one or more community mobile devices;
receiving a tracking device request from a mobile device, the tracking device request including information identifying a tracking device and including configuration instructions for configuring the tracking device, the configuration instructions identifying a tracking device beacon frequency;
identifying a community mobile device from the one or more community mobile devices within a proximity of the tracking device; and
sending the tracking device request to the identified community mobile device, the identified community mobile device configured to forward the configuration instructions identifying the tracking device beacon frequency to the tracking device, the tracking device configured to change a frequency of beacon signal transmission by the tracking device to the tracking device beacon frequency identified by the configuration instructions; and
a processor configured to execute the instructions.

9. The tracking system of claim 8, wherein the instructions, when executed, perform further steps comprising:
receiving a confirmation signal from the identified community mobile device, the confirmation signal indicating the configuration instructions were received by the tracking device; and
sending a message to the mobile device, the message including the confirmation signal.

10. The tracking system of claim 9, wherein the message further comprises information associated with the identified community mobile device.

11. The tracking system of claim 8, wherein the configuration instructions further comprise notification instructions configured to cause the tracking device to perform functions comprising one or more of: emitting sound, playing a song, emitting light, or vibrating.

12. The tracking system of claim 8, wherein the configuration instructions further comprise a list of mobile devices to add to a list of verified mobile devices stored by the tracking device.

13. The tracking system of claim 8, wherein identifying the community mobile device from the one or more community mobile devices comprises identifying the community mobile device closest to the tracking device.

14. The tracking system of claim 8, wherein identifying the community mobile device from the one or more community mobile devices comprises identifying a trusted community mobile device of the one or more community mobile devices.

15. A non-transitory computer-readable storage medium storing executable computer instructions that, when executed by a hardware processor, perform steps comprising:
storing information identifying one or more community mobile devices and information identifying one or more tracking devices within a proximity of each of the one or more community mobile devices;
receiving a tracking device request from a mobile device, the tracking device request including information identifying a tracking device and including configuration instructions for configuring the tracking device, the configuration instructions identifying a tracking device beacon frequency;

identifying a community mobile device from the one or more community mobile devices within a proximity of the tracking device; and sending the tracking device request to the identified community mobile device, the identified community mobile device configured to forward the configuration instructions identifying the tracking device beacon frequency to the tracking device, the tracking device configured to change a frequency of beacon signal transmissions of the tracking device to the tracking device beacon frequency identified by the configuration instructions.

16. The computer-readable storage medium of claim 15, wherein the instructions, when executed, perform further steps comprising receiving a confirmation signal from the identified community mobile device, the confirmation signal indicating the configuration instructions were received by the tracking device; and sending a message to the mobile device, the message including the confirmation signal.

17. The computer-readable storage medium of claim 16, wherein the message further comprises information associated with the identified community mobile device.

18. The computer-readable storage medium of claim 15, wherein the configuration instructions further comprise notification instructions configured to cause the tracking device to perform functions comprising one or more of: emitting sound, playing a song, emitting light, or vibrating.

19. The computer-readable storage medium of claim 15, wherein the configuration instructions further comprise a list of mobile devices to add to a list of verified mobile devices stored by the tracking device.

20. The computer-readable storage medium of claim 15, wherein identifying the community mobile device from the one or more community mobile devices comprises identifying the community mobile device closest to the tracking device.

21. The computer-readable storage medium of claim 15, wherein identifying the community mobile device from the one or more community mobile devices comprises identifying a trusted community mobile device of the one or more community mobile devices.

* * * * *